United States Patent
Maeda

(10) Patent No.: US 10,723,867 B2
(45) Date of Patent: Jul. 28, 2020

(54) AQUEOUS SEALING AGENT COMPOSITION FOR NON-AQUEOUS ELECTROLYTE BATTERIES

(71) Applicant: ZEON CORPORATION, Chiyoda-ku, Tokyo (JP)

(72) Inventor: Kouichirou Maeda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 71 days.

(21) Appl. No.: 15/580,036

(22) PCT Filed: Jun. 13, 2016

(86) PCT No.: PCT/JP2016/067480
§ 371 (c)(1),
(2) Date: Dec. 6, 2017

(87) PCT Pub. No.: WO2017/018079
PCT Pub. Date: Feb. 2, 2017

(65) Prior Publication Data
US 2018/0134880 A1 May 17, 2018

(30) Foreign Application Priority Data
Jul. 30, 2015 (JP) .................................. 2015-151054

(51) Int. Cl.
| | |
|---|---|
| *C08L 9/10* | (2006.01) |
| *C09K 3/10* | (2006.01) |
| *C08F 136/06* | (2006.01) |
| *C08F 136/08* | (2006.01) |
| *H01M 2/08* | (2006.01) |
| *H01M 10/0525* | (2010.01) |
| *C08F 2/26* | (2006.01) |

(52) U.S. Cl.
CPC ..................... *C08L 9/10* (2013.01); *C08F 2/26* (2013.01); *C08F 136/06* (2013.01); *C08F 136/08* (2013.01); *C09K 3/10* (2013.01); *H01M 2/08* (2013.01); *H01M 10/0525* (2013.01); *C08L 2201/54* (2013.01)

(58) Field of Classification Search
CPC ......... C08L 9/10; C08L 2201/54; C09K 3/10; C08F 136/06; C08F 136/08; H01M 10/0525; H01M 2/08
See application file for complete search history.

(56) References Cited

U.S. PATENT DOCUMENTS

2015/0240131 A1  8/2015 Furuya et al.

FOREIGN PATENT DOCUMENTS

| | | | |
|---|---|---|---|
| JP | S5384122 | A | 7/1978 |
| JP | S5516352 | A | 2/1980 |
| JP | S5530148 | A | 3/1980 |
| JP | S59112565 | A | 6/1984 |
| JP | S631706 | B2 | 1/1988 |
| JP | H0696750 | A | 4/1994 |
| JP | 3574276 | B2 | 10/2004 |
| JP | 2006107935 | A | 4/2006 |
| JP | 2006-324015 | A * | 11/2006 |
| JP | 2006324015 | A | 11/2006 |
| JP | 3956523 | B2 | 8/2007 |
| JP | 2014152183 | A | 8/2014 |
| WO | 2014054406 | A1 | 4/2014 |

OTHER PUBLICATIONS

Sep. 13, 2016, International Search Report issued in the International Patent Application No. PCT/JP2016/067480.
Feb. 6, 2018, International Preliminary Report on Patentability issued in the International Patent Application No. PCT/JP2016/067480.
Mar. 22, 2019, the Extended European Search Report issued by the European Patent Office in the corresponding European Patent Application No. 16830184.4.
Database WPI Week 201457 Thomson Scientific, London, GB; AN 2014-Q03192, XP002789632, 2014.
May 4, 2020, Communication pursuant to Article 94(3) EPC issued by the European Patent Office in the corresponding European Patent Application No. 16830184.4.
Nicolas Fedelic, Application Handbook Thermal Analysis of Polymers Selected Applications Thermal Analysis, Jan. 1, 2013, XP055608279, Retrieved from the Internet, URL: https://www.mt.com/dam/LabDiv/guides-glen/ta-polymer/TA_Polymers_Selected_Apps_EN.pdf, Retrieved on Jul. 24, 2019.

* cited by examiner

*Primary Examiner* — Robert D Harlan
(74) *Attorney, Agent, or Firm* — Kenja IP Law PC

(57) ABSTRACT

An aqueous dispersion which contains a conjugated diene polymer as the main component is contained at a solid content weight of 70 to 97 wt %.

6 Claims, No Drawings

AQUEOUS SEALING AGENT COMPOSITION FOR NON-AQUEOUS ELECTROLYTE BATTERIES

TECHNICAL FIELD

The present invention relates to an aqueous sealing agent composition used for a non-aqueous electrolyte battery.

BACKGROUND ART

A lithium ion secondary battery is often used for a power source of a small electronic device such as a notebook type personal computer, a mobile phone, or a PDA. A lithium ion secondary battery has been further used also for an automobile application in recent years. As a range of use of a lithium ion secondary battery is expanded, a demand for performance and safety of the lithium ion secondary battery (hereinafter, also simply referred to as a battery) is increasing. These batteries are usually used repeatedly by charge and discharge operation. However, due to repeated charge and discharge, a volume change of an electrode and heat generation caused by charge and discharge may increase an internal pressure of the battery, and an electrolytic solution may leak out. In this case, not only deterioration of battery characteristics but also heat generation due to a decrease of an electrolytic solution, corrosion of a device due to the electrolytic solution, and the like occur disadvantageously. For example, in a case where an electrolytic solution is used for a lithium ion secondary battery, the electrolytic solution is an organic solution and extremely dislikes water. Therefore, such a lithium ion secondary battery requires a high sealing property to completely prevent infiltration of water into the battery and to completely prevent leakage of the electrolytic solution.

For example, a lithium ion secondary battery is housed in a metal container in order to seal a power generating element thereof. In order to prevent short circuit between a positive electrode and a negative electrode, it is necessary to insulate a positive electrode terminal from a negative electrode terminal. Generally, a gasket made of an insulating material is used in an opening of a metal container containing a power generating element for insulation and sealing between positive and negative electrodes. As an insulating material, it is known to use a resin insulating gasket (for example, see Patent Literature 1).

In order to further strengthen sealing by such an insulating gasket, it has been proposed to use an insulating gasket and a sealing agent together (for example, see Patent Literatures 2 to 4). By applying this sealing agent to an insulating gasket or a metal container, and attaching the insulating gasket to a metal container, a sealing property between the insulating gasket and the metal container is increased.

Examples of such a sealing agent include a pitch material such as coal tar or asphalt, and a material obtained by adding a polymer as a modifying agent to the pitch material (for example, see Patent Literature 5). In addition to the pitch material, a butyl rubber (for example, see Patent Literature 6), a diene-based rubber having a predetermined weight average molecular weight (for example, see Patent Literature 7), a block polymer containing a diene-based monomer (for example, see Patent Literature 8), and the like have been proposed.

By the way, in recent years, an influence of volatile organic compounds (VOCs) on the environment has become a problem. The above sealing agent is used as a sealing agent composition obtained by dissolving or dispersing the sealing agent in an organic solvent as a VOC. Therefore, a sealing agent composition using no VOC is demanded.

Patent Literature 9 has proposed an aqueous sealing agent composition. However, performance demanded for a sealing agent is not sufficient. For example, strength of a sealing agent layer formed by the aqueous sealing agent composition is insufficient compared with that of a sealing agent layer obtained by a sealing agent composition using an organic solvent. In addition, Patent Literature 10 has proposed an aqueous sealing agent composition using no VOC. However, a battery using an aqueous electrolytic solution is a target, and no consideration has been given to a non-aqueous electrolyte battery.

CITATION LIST

Patent Literature

Patent Literature 1: JP 53-084122 A
Patent Literature 2: JP 55-030148 A
Patent Literature 3: JP 55-016352 A
Patent Literature 4: JP 59-112565 A
Patent Literature 5: JP 6-96750 A
Patent Literature 6: WO 2014/54406 A
Patent Literature 7: JP 3574276 B2
Patent Literature 8: JP 3956523 B2
Patent Literature 9: JP 63-1706 A
Patent Literature 10: JP 2006-107935 A

SUMMARY OF INVENTION

Technical Problem

An object of the present invention is to provide an aqueous sealing agent composition for a non-aqueous electrolyte battery, capable of obtaining a sealing agent layer having excellent characteristics without using a volatile organic compound.

Solution to Problem

As a result of intensive studies, the present inventor has found that the above object is achieved by using a polymer containing a conjugated diene-based polymer as a main component at a predetermined ratio, and has completed the present invention.

That is, the present invention provides:

(1) an aqueous sealing agent composition for a non-aqueous electrolyte battery, containing an aqueous dispersion in an amount of 70 to 97 wt % in terms of weight of a solid content, the aqueous dispersion containing a conjugated diene-based polymer as a main component;

(2) the aqueous sealing agent composition for a non-aqueous electrolyte battery according to (1), further containing a water-soluble polymer in an amount of 3 to 30 wt % in terms of weight of a solid content, in which a total solid content concentration is 5 to 70 wt %;

(3) the aqueous sealing agent composition for a non-aqueous electrolyte battery according to (1) or (2), in which the conjugated diene-based polymer is polybutadiene, and the polybutadiene is used as a latex of polybutadiene obtained by emulsion polymerization using an anionic surfactant; and (4) the aqueous sealing agent composition for a non-aqueous electrolyte battery according to (2) or (3), in which the water-soluble polymer has a viscosity of 4 to 500 mPa·s when being formed into a 4% aqueous solution.

Advantageous Effects of Invention

According to the aqueous sealing agent composition for a non-aqueous electrolyte battery of the present invention, a sealing agent layer having excellent characteristics can be obtained without using a volatile organic compound.

DESCRIPTION OF EMBODIMENTS

Hereinafter, the aqueous sealing agent composition for a non-aqueous electrolyte battery of the present invention will be described. The aqueous sealing agent composition for a non-aqueous electrolyte battery (hereinafter, also referred to as an "aqueous sealing agent composition") of the present invention contains an aqueous dispersion containing a conjugated diene-based polymer as a main component in an amount of 70 to 97 wt % in terms of weight of a solid content.

(Aqueous Dispersion Containing Conjugated Diene-Based Polymer as Main Component)

The conjugated diene-based polymer contained as a main component in the aqueous dispersion is not particularly limited as long as being a polymer containing a conjugated diene monomer unit obtained by polymerizing a diene-based monomer. However, at least one selected from the group consisting of a conjugated diene homopolymer and a conjugated diene-based copolymer is preferably used. Here, the conjugated diene-based polymer is preferably contained in an amount of 20 wt % or more, more preferably in an amount of 30 wt % or more in terms of weight of a solid content in the aqueous dispersion.

The conjugated diene homopolymer is only required to be a polymer obtained by polymerizing only a diene-based monomer, and a polymer generally used industrially can be used without particular limitation. Examples of a diene-based monomer forming a conjugated diene monomer unit of the conjugated diene homopolymer include 1,3-butadiene, isoprene, 2,3-dimethyl-1,3-butadiene, 1,3-pentadiene, 1,3-hexadiene chloroprene, and cyanobutadiene. Among these diene-based monomers, 1,3-butadiene and isoprene are preferable, and 1,3-butadiene is more preferable. These diene-based monomers can be used singly or in combination of two or more kinds thereof.

Specific examples of the conjugated diene homopolymer include polybutadiene, polyisoprene, polychloroprene, polycyanobutadiene, and polypentadiene. Among these conjugated diene homopolymers, polybutadiene and polyisoprene are preferable, and polybutadiene is more preferable. A polymerization form of the conjugated diene homopolymer is not particularly limited, and is only required to be appropriately selected according to intended use.

The conjugated diene-based copolymer is not particularly limited as long as being a copolymer containing at least a conjugated diene monomer unit. As the diene-based monomer forming the conjugated diene monomer unit of the conjugated diene-based copolymer, a compound similar to the above conjugated diene homopolymer can be used.

A monomer forming a monomer unit other than the conjugated diene monomer unit of the conjugated diene-based copolymer is not particularly limited as long as being a monomer copolymerizable with a diene-based monomer, but examples thereof include a cyano group-containing vinyl monomer, an amino group-containing vinyl monomer, a pyridyl group-containing vinyl monomer, an alkoxyl group-containing vinyl monomer, and an aromatic vinyl monomer. Among these monomers, a cyano group-containing vinyl monomer and an aromatic vinyl monomer are preferable, and an aromatic vinyl monomer is more preferable. These monomers copolymerizable with a diene-based monomer can be used singly or in combination of two or more kinds thereof.

Examples of the aromatic vinyl monomer include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, N,N-dimethylaminoethylstyrene, and N,N-diethylaminoethylstyrene. Among these aromatic vinyl monomers, styrene and α-methylstyrene are particularly preferable.

These aromatic vinyl monomers can be used singly or in combination of two or more kinds thereof.

A ratio between a diene-based monomer and a monomer copolymerizable with the diene-based monomer in the conjugated diene-based copolymer is only required to be appropriately selected according to intended use, and is usually in a range of 5/95 to 95/5, preferably in a range of 10/90 to 90/10, more preferably in a range of 20/80 to 80/20 in terms of a weight ratio of "conjugated diene monomer unit/copolymerizable monomer unit".

As the conjugated diene-based copolymer, either a random copolymer or a block copolymer can be used, but the random copolymer is preferable.

In the present invention, as the conjugated diene-based polymer, the above conjugated diene homopolymer and conjugated diene-based copolymer can be used singly or in combination of two or more kinds thereof.

A glass transition temperature (Tg) of the conjugated diene-based polymer used in the present invention is preferably lower than −30° C., more preferably lower than −40° C., and still more preferably lower than −60° C. When the glass transition temperature is in the above range, it is possible to suppress a phenomenon that sealing performance of a sealing agent layer obtained from an aqueous sealing agent composition is deteriorated at a low temperature because of an excessively high glass transition temperature.

The amount of a 1,2-vinyl bond of a conjugated diene portion of the conjugated diene-based polymer used in the present invention is not particularly limited, and is only required to be appropriately selected according to intended use, but is usually 5 mol % or more, preferably 40 mol % or more, more preferably 60 mol % or more, and still more preferably 80 mol % or more.

In addition, the conjugated diene-based polymer used in the present invention is preferably polybutadiene having a 1,4-cis content (content of a cis isomer) of 90% or more.

The molecular weight of the conjugated diene-based polymer used in the present invention is not particularly limited, and is only required to be appropriately selected according to intended use, but is usually in a range of 500 to 5,000,000, and preferably in a range of 1,000 to 1,000,000 in terms of a weight average molecular weight measured by gel permeation chromatography (in terms of polystyrene, toluene eluent).

In a case where a conjugated diene homopolymer and a conjugated diene-based copolymer are used in combination as the conjugated diene-based polymer, the molecular weight of the conjugated diene homopolymer is usually in a range of 500 to 500,000, preferably in a range of 1,000 to 10,000, and more preferably in a range of 1,000 to 5,000 in terms of a weight average molecular weight measured by gel permeation chromatography (in terms of polystyrene, toluene eluent). Meanwhile, the molecular weight of the conjugated diene-based copolymer is usually in a range of 1,000 to 1,000,000, preferably in a range of 5,000 to 500,000, and more preferably in a range of 10,000 to 300,000 in terms of a weight average molecular weight measured by gel permeation chromatography (in terms of polystyrene, toluene eluent).

Furthermore, in a case where a conjugated diene homopolymer and a conjugated diene-based copolymer are used in combination, a ratio between these polymers is not particularly limited, and is only required to be appropriately selected according to intended use, but is usually in a range of 5/95 to 90/10, preferably in a range of 10/90 to 90/10, and more preferably in a range of 30/70 to 80/20 in terms of a weight ratio of "conjugated diene homopolymer/conjugated diene-based copolymer".

The conjugated diene-based polymer is manufactured, for example, by polymerizing a monomer composition containing the above monomer in an aqueous solvent.

The aqueous solvent is not particularly limited as long as being able to disperse the conjugated diene-based polymer, and is selected from aqueous solvents having a boiling point of preferably 80 to 350° C., more preferably 100 to 300° C. at a normal pressure.

Specifically, water is preferable as the aqueous solvent from a viewpoint of having no flammability and easily obtaining a dispersion of the conjugated diene-based polymer. Note that water may be used as a main solvent and an aqueous solvent other than the above water may be mixed and used in a range in which the effect of the present invention is not impaired and a dispersed state of the conjugated diene-based polymer can be ensured.

A polymerization method for the conjugated diene-based polymer is not particularly limited, and any method such as a solution polymerization method, a suspension polymerization method, a bulk polymerization method, or an emulsion polymerization method can be used. The polymerization method may be any one of ion polymerization, radical polymerization, living radical polymerization, and the like. Note that an emulsion polymerization method is particularly preferable from such a viewpoint of manufacturing efficiency as follows. That is, it is easy to obtain a high molecular weight product, and the conjugated diene-based polymer is obtained in a state of a latex in which the conjugated diene-based polymer is dispersed in water as it is, therefore a redispersion treatment is unnecessary, and the conjugated diene-based polymer can be used as it is as an aqueous dispersion containing the conjugated diene-based polymer as a main component for the aqueous sealing agent composition of the present invention. Note that emulsion polymerization can be performed according to a usual method. In emulsion polymerization, a polymerization auxiliary material usually used, such as an emulsifier, a polymerization initiator, a molecular weight regulator, or a chain transfer agent can be used.

As the emulsifier, any emulsifier can be used as long as a desired polymer is obtained, and examples thereof include an anionic surfactant, a nonionic surfactant, a cationic surfactant, and an amphoteric surfactant. Among these surfactants, an anionic surfactant such as an alkylbenzene sulfonate, an aliphatic sulfonate, a sulfate of a higher alcohol, an α-olefin sulfonate, or an alkyl ether sulfate can be preferably used.

More specifically, examples of the anionic surfactant include sodium dodecylbenzene sulfonate, sodium lauryl sulfate, sodium dodecyl diphenyl ether disulfonate, and sodium dialkylsulfosuccinate. For example, a reactive emulsifier having an unsaturated bond may be used. Among these compounds, sodium dodecylbenzenesulfonate is preferable. These emulsifiers may be used singly or in combination of two or more kinds thereof at any ratio.

The emulsifier can be used in any amount as long as a desired polymer is obtained. The amount is preferably 0.5 parts by weight or more, more preferably 1 part by weight or more, preferably 10 parts by weight or less, and more preferably 5 parts by weight or less relative to 100 parts by weight of a monomer composition.

As the polymerization initiator used in a polymerization reaction, any polymerization initiator can be used as long as a desired polymer is obtained. Examples thereof include sodium persulfate (NaPS), ammonium persulfate (APS), and potassium persulfate (KPS).

In polymerization, a polymerization system may include a molecular weight regulator or a chain transfer agent. Examples of the molecular weight regulator or the chain transfer agent include an alkyl mercaptan such as n-hexyl mercaptan, n-octyl mercaptan, t-octyl mercaptan, n-dodecyl mercaptan, t-dodecyl mercaptan, or n-stearyl mercaptan; a xanthogen compound such as dimethylxanthogen disulfide or diisopropylxanthogen disulfide; terpinolene; a thiuram compound such as tetramethyl thiuram disulfide, tetraethyl thiuram disulfide, or tetramethylthiuram monosulfide; a phenol compound such as 2,6-di-t-butyl-4-methyl phenol or styrenated phenol; an allyl compound such as allyl alcohol; a halogenated hydrocarbon compound such as dichloromethane, dibromomethane, or carbon tetrabromide; thioglycolic acid, thiomalic acid, 2-ethylhexyl thioglycolate, diphenylethylene, and α-methyl styrene dimer. Among these compounds, an alkyl mercaptan is preferable, and t-dodecyl mercaptan is more preferable from a viewpoint of suppressing a side reaction. These compounds may be used singly or in combination of two or more kinds thereof at any ratio.

In polymerization, seed polymerization may be performed by employing seed particles. Polymerization conditions can also be arbitrarily selected depending on a polymerization method and the type of polymerization initiator.

The solid content concentration in the aqueous dispersion containing the conjugated diene-based polymer as a main component is preferably 20 to 70 wt %, and more preferably 30 to 65 wt %.

Note that the aqueous dispersion containing the conjugated diene-based polymer as a main component may contain a component other than the conjugated diene-based polymer. The component other than the conjugated diene-based polymer is not particularly limited as long as not impairing sealing performance of the sealing agent composition of the present invention, but examples thereof include an aqueous dispersion of a modified polyolefin and an aqueous dispersion of an alkyl poly(meth)acrylate.

The content of the component other than the conjugated diene-based polymer is preferably 40 wt % or less, and more preferably 30 wt % or less in terms of weight of a solid content in the aqueous dispersion.

(Aqueous Sealing Agent Composition)

The aqueous sealing agent composition of the present invention contains an aqueous dispersion containing the above conjugated diene-based polymer as a main component in an amount of 70 to 97 wt %, preferably 80 to 95 wt %, more preferably 85 to 93 wt % in terms of weight of a solid content. When a content ratio of the above aqueous dispersion in the aqueous sealing agent composition is too large, wettability of the sealing agent composition is deteriorated. When a content ratio of the above aqueous dispersion in the aqueous sealing agent composition is too small, flexibility of a sealing agent layer obtained using the aqueous sealing agent composition is deteriorated. That is, sealing performance is deteriorated.

Furthermore, the aqueous sealing agent composition of the present invention preferably contains a water-soluble polymer in addition to the aqueous dispersion containing the above conjugated diene-based polymer as a main component. Examples of the water-soluble polymer include polyvinyl alcohol, polyacrylic acid, and polystyrenesulfonic acid, but polyvinyl alcohol is preferable, and polyvinyl alcohol having a saponification ratio of 98 mol % or more, called a completely saponified type, is particularly preferably used.

A 4% aqueous solution of the water-soluble polymer more preferably has a viscosity of 4 to 500 mPa·s. Note that the viscosity in the present invention is a value of a viscosity at a liquid temperature of 20° C., measured using a Brookfield viscometer (B type viscometer).

A content ratio of the water-soluble polymer in the aqueous sealing agent composition is preferably 3 to 30 wt % in terms of weight of a solid content.

The solid content concentration of the aqueous sealing agent composition of the present invention is preferably 5 to 70 wt %, more preferably 20 to 60 wt %, and still more preferably 30 to 50 wt %. When the solid content concentration is in the above range, it is possible to suppress a phenomenon that it is difficult to obtain a sealing agent layer having a desired film thickness because of an excessively high solid content concentration, and it is possible to suppress a phenomenon that drying time is long for forming a sealing agent layer because of an excessively low solid content concentration. The solid content concentration of the sealing agent composition can be adjusted by a known method such as concentration using a rotary evaporator.

An additive such as a coloring agent may be further added to the aqueous sealing agent composition of the present invention if necessary. The coloring agent which can be added is desirably a coloring agent which does not react with an electrolytic solution and is not dissolved in the electrolytic solution, and examples thereof include various organic and inorganic pigments. Among these pigments, carbon black, particularly carbon black having a particle diameter of 0.1 μm or less, such as furnace black or channel black is preferable. In a case where such a coloring agent is added, it is necessary to dissolve or disperse the coloring agent in the composition sufficiently uniformly. In a case of using a granulated coloring agent or a coloring agent having an aggregated structure, the coloring agent is preferably dispersed using a ball mill, a sand mill, ultrasonic waves, or the like. The addition amount of an additive such as a coloring agent may be any amount as needed, but is usually 0.01 wt % to 20 wt %, preferably 0.01 wt % to 5 wt %, and more preferably 0.02 wt % to 3 wt % relative to the amount of the conjugated diene-based polymer. When the addition amount of an additive is in the above range, it is possible to suppress a phenomenon that flexibility of a sealing agent layer is small because of an excessively large addition amount to cause cracking.

Examples of a method for preparing the aqueous sealing agent composition of the present invention include a method for adding a water-soluble polymer and another component such as an additive to an aqueous dispersion containing a conjugated diene-based polymer as a main component; and a method for preparing each of an aqueous dispersion containing a conjugated diene-based polymer as a main component and an aqueous solution of a water-soluble polymer, mixing these products, and then adding another component such as an additive thereto.

(Non-Aqueous Electrolyte Battery)

A non-aqueous electrolyte battery using the aqueous sealing agent composition of the present invention includes a sealing agent layer formed of the above aqueous sealing agent composition between an insulating gasket attached to an opening of a metal container containing a power generating element and the metal container and/or between the insulating gasket and a sealing body. A material of the metal container used for the non-aqueous electrolyte battery, the power generating element, and the insulating gasket may be those generally used. In this non-aqueous electrolyte battery, the power generating element is housed in the metal container and is sealed.

The power generating element is an electrolyte, an active material for a positive electrode and a negative electrode, a separator, or the like. As the electrolyte, an electrolyte solution (electrolytic solution) containing a supporting electrolyte and an organic electrolyte solvent is used.

In the non-aqueous electrolyte battery, as the supporting electrolyte constituting the electrolytic solution, a compound which is easily hydrolyzed by reacting with water, such as a lithium compound exemplified by $LiPF_6$, $LiBF_4$, or $LiClO_4$, is used. As the non-aqueous electrolyte solvent, for example, a flammable organic compound such as propylene carbonate (PC), ethylene carbonate (EC), or diethyl carbonate (DEC) is used. As the insulating gasket, a polyolefin resin which is generally said to have high electrolytic solution resistance, such as polyethylene, polypropylene, or ethylene copolymerized polypropylene, is preferably used. It is good to use a polyolefin resin having a heat distortion temperature measured by JIS K 7207 of 90 to 200° C., preferably 90 to 150° C., more preferably 95 to 130° C. When the heat distortion temperature is in the above range, it is possible to suppress a phenomenon that a bending elastic modulus at room temperature increases because of a too high heat distortion temperature, resulting in deformation at the time of attachment of an insulating gasket to cause cracking or breaking, and it is possible to suppress a phenomenon that resistance of an insulating gasket at a high temperature is poor because of a too low heat distortion temperature and a sealing property is deteriorated.

The sealing agent layer of the non-aqueous electrolyte battery can be formed, for example, by the following procedure. First, a predetermined amount of the sealing agent composition is fed and applied to a surface of the metal container and/or a surface of the insulating gasket with a quantitative pump such as an air-driven quantitative dispenser, a roller pump, or a gear pump. After application, the sealing agent composition is naturally dried while being maintained in a horizontal position so that the sealing agent composition may not be shifted, and an aqueous solvent is removed to form a thin layer.

Note that the application is not limited to a method using a quantitative pump, but can be performed manually with a brush if the amount is small. For drying, forced drying using a heating device may be performed in place of natural drying. In this case, drying in a short time is possible, and a more industrially suitable process can be obtained.

The thickness of the sealing agent layer formed by the above method is only required to be appropriately selected according to the size of each of the metal container and the insulating gasket, and is usually 0.1 μm to 1000 μm. When the thickness of the layer is in the above range, it is possible to suppress a phenomenon that a problem such as leakage of an electrolytic solution or infiltration of water is caused or the layer is cut because of an excessively insufficient thickness of the layer, and it is possible to suppress a phenomenon that it is difficult to form a sealing agent layer because of an excessively large thickness of the layer.

As a non-aqueous electrolyte battery using the aqueous sealing agent composition of the present invention, a lithium ion secondary battery is preferable.

EXAMPLES

Hereinafter, the present invention will be described with reference to Examples, but the present invention is not limited thereto. In the present Examples, parts and % are based on a weight unless otherwise specified. In Examples and Comparative Examples, wettability, coating film appearance, peeling strength, and flexibility were evaluated as follows.

(Wettability)

Each of sealing agent compositions prepared in Examples and Comparative Examples was applied to a polypropylene film using a doctor blade having a width of 100 mm and a gap of 100 μm, and was dried on a hot plate at 80° C. The width of the coating film after drying was measured with a vernier caliper, and a ratio of the width of the coating film with respect to the width of the doctor blade was calculated. Table 1 indicates results thereof. When the width of the coating film is 95% or more, it can be judged that wettability is good.

(Appearance of Coating Film)

An appearance of a surface of a sealing agent layer of each of test pieces obtained in Examples and Comparative Examples was visually judged. A case where a defect such as a crack or a pinhole was not observed on a surface of a sealing agent layer was evaluated as "excellent", and a case where a defect such as a crack or a pinhole was observed on a surface of a sealing agent layer was evaluated as "poor". Table 1 indicates results thereof.

(Peeling Strength)

Peeling strength of each of test pieces including a sealing agent layer on an aluminum foil and a polypropylene film, obtained in Examples and Comparative Examples, was measured by a 180° peeling method in accordance with JIS Z 0237. Specifically, an aluminum tape with an adhesive was bonded to a test piece cut into a ribbon shape and having a width of 20 mm, and peeling strength was measured at a pulling rate of 300 mm/min at 23° C. using a tensile tester. Table 1 indicates results thereof.

(Flexibility (Bending Resistance))

Among the test pieces obtained in Examples and Comparative Examples, a test piece having a sealing agent layer formed on an aluminum foil was immersed in methanol at −30° C. for 1 hour. Immediately after the test piece was taken out, the test piece was folded with the sealing agent layer outside. The bent portion was observed, and cracking, peeling, or the like was observed. A case where cracking, peeling, or the like was not observed was evaluated as "excellent", and a case where cracking, peeling, or the like was observed was evaluated as "poor". Table 1 indicates results thereof.

Example 1

(Polymerization of 1,3-Butadiene Polymer Latex)

To a 10 liter autoclave equipped with a stirrer, 2000 g of deionized water, 810 g of butadiene, and 20 g of sodium dodecylbenzenesulfonate were added, and were sufficiently stirred. Thereafter, 0.27 mol of potassium peroxide and 0.6 mmol of a chromium chloride/pyridine complex were added thereto, and the resulting mixture was polymerized while being stirred at 60° C. for 60 hours. Thereafter, 100 ml of methanol was added thereto to terminate the polymerization. After termination of the polymerization, the polymerization solution was cooled to room temperature, and then was taken out. The obtained polymer had Mw of 350,000. A result of 13C-NMR spectrum indicated that the content of a cis-isomer in this polymer was 94%.

(Aqueous Sealing Agent Composition)

The aqueous dispersion of the 1,3-butadiene polymer obtained above was heated and depressurized at 60° C. using a rotary evaporator, and was concentrated to manufacture an aqueous dispersion having a solid content concentration of 50 wt %.

To 95 parts of the obtained aqueous dispersion of the 1,3-butadiene polymer in terms of weight of a solid content, 5 parts of a 10 wt % aqueous solution of polyvinyl alcohol (polyvinyl alcohol JF 17 manufactured by Japan Vam & Bipoval Co., Ltd.) in terms of weight of a solid content was added, and the resulting mixture was concentrated using a rotary evaporator to obtain a sealing agent composition.

(Test Piece)

The obtained sealing agent composition was cast on an aluminum foil (20 μm in thickness) with a doctor blade having a gap of 200 μm, and was heated and dried at 80° C. for 20 minutes to form a film-shaped sealing agent layer to obtain a test piece having the sealing agent layer formed on the aluminum foil.

The obtained sealing agent composition was cast on a polypropylene film (PP film) (20 μm in thickness) with a doctor blade having a gap of 200 μm, and was heated and dried at 80° C. for 20 minutes to obtain a film-shaped sealing agent layer to obtain a test piece having the sealing agent layer formed on the polypropylene film.

Example 2

A test piece was obtained in a similar manner to Example 1 except that, in preparing an aqueous sealing agent composition, to 90 parts of the aqueous dispersion of the 1,3-butadiene polymer in terms of weight of a solid content, 10 parts of a 10 wt % aqueous solution of polyvinyl alcohol (polyvinyl alcohol JF 17 manufactured by Japan Vam & Bipoval Co., Ltd.) in terms of weight of a solid content was added to obtain an aqueous sealing agent composition.

Example 3

(Polymerization of Isoprene Polymer Latex)

To a 10 liter autoclave equipped with a stirrer, 2000 g of deionized water and 800 g of isoprene were added, and were sufficiently stirred. Thereafter, 0.27 mol of potassium peroxide and 0.6 mmol of a chromium chloride/pyridine complex were added thereto, and the resulting mixture was polymerized while being stirred at 60° C. for 12 hours. Thereafter, 100 ml of methanol was added thereto to terminate the polymerization. After termination of the polymerization, the polymerization solution was cooled to room temperature, and then was taken out. The obtained polymer had Mw of 300,000.

(Aqueous Sealing Agent Composition)

80 parts of the aqueous dispersion of the 1,3-butadiene polymer obtained in Example 1 in terms of weight of a solid content, 10 parts of the isoprene polymer obtained above in terms of weight of a solid content, and 10 parts of a 10 wt % aqueous solution of polyvinyl alcohol (polyvinyl alcohol JF 17 manufactured by Japan Vam & Bipoval Co., Ltd.) in terms of weight of a solid content were mixed to obtain an aqueous sealing agent composition.

A test piece was obtained in a similar manner to Example 1 except that the aqueous sealing agent composition obtained above was used.

Comparative Example 1

A test piece was obtained in a similar manner to Example 1 except that, in preparing an aqueous sealing agent composition, to 50 parts of the aqueous dispersion of the 1,3-butadiene polymer in terms of weight of a solid content, 50 parts of a 10 wt % aqueous solution of polyvinyl alcohol (polyvinyl alcohol JF 17 manufactured by Japan Vam & Bipoval Co., Ltd.) in terms of weight of a solid content was added to obtain an aqueous sealing agent composition.

Comparative Example 2

A test piece was obtained in a similar manner to Example 1 except that 100 parts of the aqueous dispersion of the 1,3-butadiene polymer in terms of weight of a solid content was used as the aqueous sealing agent composition.

TABLE 1

| | | Ex. 1 | Ex. 2 | Ex. 3 | Comp. Ex. 1 | Comp. Ex. 2 |
|---|---|---|---|---|---|---|
| Sealing agent composition | Composition 1,3-Butadiene polymer (part) | 95 | 90 | 80 | 58 | 100 |
| | Isoprene polymer (part) | 0 | 0 | 10 | 0 | 0 |
| | Polyvinyl alcohol (part) | 5 | 10 | 10 | 50 | 0 |
| | Solid content concentration (%) | 45 | 42 | 40 | 40 | 50 |
| Evaluation item | Wettability | 100% | 100% | 100% | 100% | 60% |
| | Coating film appearance | Excellent | Excellent | Excellent | Poor | Excellent |
| | Peeling strength (N/20 mm) Aluminum foil | 8.2 | 10.2 | 9.5 | 4.5 | 12 |
| | PP film | 8.5 | 12.2 | 10.3 | 5.2 | 14 |
| | Flexibility (Bending resistance) | Excellent | Excellent | Excellent | Poor | Excellent |

As indicated in Table 1, by using an aqueous sealing agent composition for a non-aqueous electrolyte battery containing an aqueous dispersion containing a conjugated diene-based polymer as a main component in an amount of 70 to 97 wt % in terms of weight of a solid content, it was possible to form a sealing agent layer having excellent wettability, coating film appearance, peeling strength, and flexibility.

The invention claimed is:

1. An aqueous sealing agent composition for a non-aqueous electrolyte battery, comprising an aqueous dispersion in an amount of 70 to 97 wt % in terms of weight of a solid content, the aqueous dispersion containing a conjugated diene-based polymer in an amount of 20 wt % or more in terms of the weight of the solid content, and wherein
the conjugated diene-based polymer has a glass transition temperature lower than −30° C.,
the conjugated diene-based polymer is polybutadiene, and
the polybutadiene is used as a latex of polybutadiene obtained by emulsion polymerization using an anionic surfactant.

2. The aqueous sealing agent composition for a non-aqueous electrolyte battery according to claim 1, further comprising a water-soluble polymer in an amount of 3 to 30 wt % in terms of the weight of the solid content, wherein a total solid content concentration is 5 to 70 wt %.

3. The aqueous sealing agent composition for a non-aqueous electrolyte battery according to claim 2, wherein the water-soluble polymer has a viscosity of 4 to 500 mPa·s when being formed into a 4% aqueous solution.

4. An aqueous sealing agent composition for a non-aqueous electrolyte battery, comprising an aqueous dispersion in an amount of 70 to 97 wt % in terms of weight of a solid content, the aqueous dispersion containing a conjugated diene-based polymer in an amount of 20 wt % or more in terms of the weight of the solid content, and
wherein the conjugated diene-based polymer is polybutadiene, and the polybutadiene is used as a latex of polybutadiene obtained by emulsion polymerization using an anionic surfactant.

5. The aqueous sealing agent composition for a non-aqueous electrolyte battery according to claim 4, further comprising a water-soluble polymer in an amount of 3 to 30 wt % in terms of the weight of the solid content, wherein a total solid content concentration is 5 to 70 wt %.

6. The aqueous sealing agent composition for a non-aqueous electrolyte battery according to claim 5, wherein the water-soluble polymer has a viscosity of 4 to 500 mPa·s when being formed into a 4% aqueous solution.

* * * * *